(12) United States Patent
Chen et al.

(10) Patent No.: US 7,058,012 B1
(45) Date of Patent: Jun. 6, 2006

(54) SYSTEMS AND METHODS FOR AUTOMATIC END-TO-END PATH PROVISIONING FOR SONET NETWORKS

(75) Inventors: Hechun Chen, Fremont, CA (US); Perin N. Jathavedam, San Ramon, CA (US)

(73) Assignee: CIENA Corporation, Linthicum, MD (US)

( * ) Notice: Subject to any disclaimer, the term of this patent is extended or adjusted under 35 U.S.C. 154(b) by 932 days.

(21) Appl. No.: 09/916,076

(22) Filed: Jul. 26, 2001

(51) Int. Cl.
*H04J 1/16* (2006.01)
*H04J 3/14* (2006.01)
(52) U.S. Cl. .................. 370/222; 370/238; 370/258
(58) Field of Classification Search .............. 370/221, 370/222, 223, 224, 227, 238, 254, 258, 257; 709/238, 220, 221, 222
See application file for complete search history.

(56) References Cited

U.S. PATENT DOCUMENTS

| | | | | |
|---|---|---|---|---|
| 5,708,778 | A * | 1/1998 | Monot | 709/228 |
| 6,263,387 | B1 * | 7/2001 | Chrabaszcz | 710/302 |
| 6,665,713 | B1 * | 12/2003 | Hada et al. | 709/220 |
| 6,694,455 | B1 * | 2/2004 | Scrandis et al. | 714/31 |
| 6,738,825 | B1 * | 5/2004 | Bortolotto et al. | 709/238 |
| 2001/0003833 | A1 * | 6/2001 | Tomizawa et al. | 709/240 |
| 2002/0032761 | A1 * | 3/2002 | Aoyagi et al. | 709/223 |
| 2002/0141345 | A1 * | 10/2002 | Szviatovszki et al. | 370/238 |
| 2005/0185654 | A1 * | 8/2005 | Zadikian et al. | 370/395.21 |

* cited by examiner

*Primary Examiner*—Ajit Patel
(74) *Attorney, Agent, or Firm*—Dougherty Clements; Christopher L. Bernard; Tyler S. Brown

(57) ABSTRACT

Systems and methods for automatic end-to-end paths for SONET networks are disclosed. The method for path provisioning generally includes obtaining path parameters for each network element, performing discovery of paths including determining connection possibilities based upon the path parameters, and provisioning an end-to-end STS-n path based on the paths resulting from the discovery.

18 Claims, 12 Drawing Sheets

SYSTEMS AND METHODS FOR AUTOMATIC END-TO-END PATH PROVISIONING FOR SONET NETWORKS

CROSS REFERENCE TO RELATED APPLICATIONS

This application is related to co-pending U.S. patent application Ser. No. 09/661,203, entitled "Methods and Apparatuses for Providing Multiple Services from Any Slot in a SONET Systems Having Multiple Slots" and filed on Sep. 14, 2000, and U.S. patent application Ser. No. 09/658,778, entitled "Method and Apparatus for Partitioning SONET Frames into Logical Channels to Optimize Bandwidth Utilization" and filed on Sep. 11, 2000, the entireties of which are incorporated by reference herein.

BACKGROUND OF THE INVENTION

1. Field of the Invention

The present invention relates generally to telecommunication systems. More specifically, systems and methods for automatic provisioning of equipment, topology, and end-to-end paths for SONET networks are disclosed.

2. Description of Related Art

With the maturation of the computer and data networking technologies, terabits of complex, mixed data traffic types are increasingly transmitted via high-speed and high-capacity fiber optic based networks such as Synchronous Optical Network (SONET). SONET is a set of ANSI telecommunications standards for synchronous optical networks. SONET has become a high bandwidth fiber optic based transport system that provides the foundation for linking high-speed network switches and multiplexers. In particular, SONET provides a standard operating environment for managing high bandwidth services and incorporates multiplexing, service mappings, and standardized interfaces such that commercial vendors can develop interconnecting technologies.

SONET utilizes the Synchronous Transport Signal (STS), at a line rate of 51.84 Mbps, for communication between nodes of a SONET network to allow control, provisioning, administration, and security. The STS is comprised of payload information and signaling and protocol overhead. Because two ends of a SONET transmission may vary in format and speed, data is generally converted to the STS format, transmitted, and converted into the appropriate user format when the data is received.

A SONET network is generally laid out in a ring topology in which two or more transmission paths over fiber optic cables are provided between network nodes or network elements (NEs) to form a closed loop. Time division multiplexing (TDM) is utilized to simultaneously transmit multiple data streams over the transmission paths. Traffic transmitted over a SONET ring may include standard synchronous data such as DS1 and DS3 data, asynchronous transfer mode (ATM) data, and various types of packet data such as Internet Protocol (IP) and frame relay (FR) data.

Various protection mechanisms are defined for SONET networks to provide redundancy and protection against transmission failures. Defects or failures on a SONET ring may result from various causes such as defects in the fiber optic cable, problems in the network elements or nodes, and failures in the processing of a transmitted or received signal. Examples of SONET protection mechanisms include 1+1, 1:1 (Bellcore GR-253-CORE), unidirectional path switched ring or UPSR (Bellcore GR-1400-CORE), and bi-directional line switched ring or BLSR (Bellcore GR-1230-CORE). SONET rings typically include one or more pairs of working paths and protection paths. If a working path fails, the bandwidth capacity of the protection path is utilized. Various protection mechanisms for monitoring, protecting, and recovering specific types of traffic such as ATM, frame relay, and IP may be utilized in conjunction with or independently of the dedicated SONET protection mechanisms.

Each network node within the SONET network may include a number of devices and facilities. Each device in the network are manually provisioned before it can be utilized in the SONET network. Such manual provisioning may include system provisioning, topology provisioning, and end-to-end path provisioning. System provisioning typically includes equipment and facilities provisioning. Manual provisioning is difficult, tedious, time consuming, costly, and error prone. In addition, once a human error is made, the error is often difficult to pin point and identify. In addition, manual provisioning is not dynamic, lacks scalability, and may not be optimized. Moreover, network traffic is complex and network environment often changes quickly, further rendering the manual provisioning process more difficult, time consuming, and error prone.

Thus, what is needed is a better provisioning system and method that preferably reduces human errors, is less time consuming and is more cost effective.

SUMMARY OF THE INVENTION

Systems and methods for automatic provisioning of end-to-end paths for SONET networks are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The system for automatic end-to-end path provisioning for an optical network by a network management system generally comprises an input device for obtaining path parameters for each network element of the network and a processor for automatically performing discovery of paths including determine connection possibilities based upon the path parameters and for automatically provisioning an end-to-end STS-n path based on the paths resulting from the discovery.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

Systems and methods for automatic provisioning of equipment, topology, and end-to-end paths for SONET networks are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Systems and methods for automatic provisioning of equipment, topology, and end-to-end paths for SONET networks described herein are preferably implemented in a SONET network system utilizing Trans-Metro Optical (TMO) switches. In one preferred embodiment, TMO switches streamlines the SONET network hierarchy between the customer premises, central office (CO) and major switch sites/Interexchange carrier points of presence (POPs). The TMO platform is a SONET platform that ideally replaces functionality provided by stand-alone digital cross connects (DCS), SONET add/drop multiplexers (ADMs), ATM switches, Frame Relay switches, and/or digital subscriber line access multiplexers (DSLAMs), as well as support for wavelength division multiplexing (WDM). For example, the TMO switches may be utilized to connect business and residential Internet access subscribers within cities directly to the fiber-optic long-distance telephone networks that transmit voice and computer data between metropolitan areas. However, it is to be understood that the automatic provisioning systems and methods described herein may be adapted and implemented for use in any other suitable data networking system, preferably optical data networking systems.

Overview of an Exemplary SONET Network Architecture Utilizing TMO Switches

Figure 1:
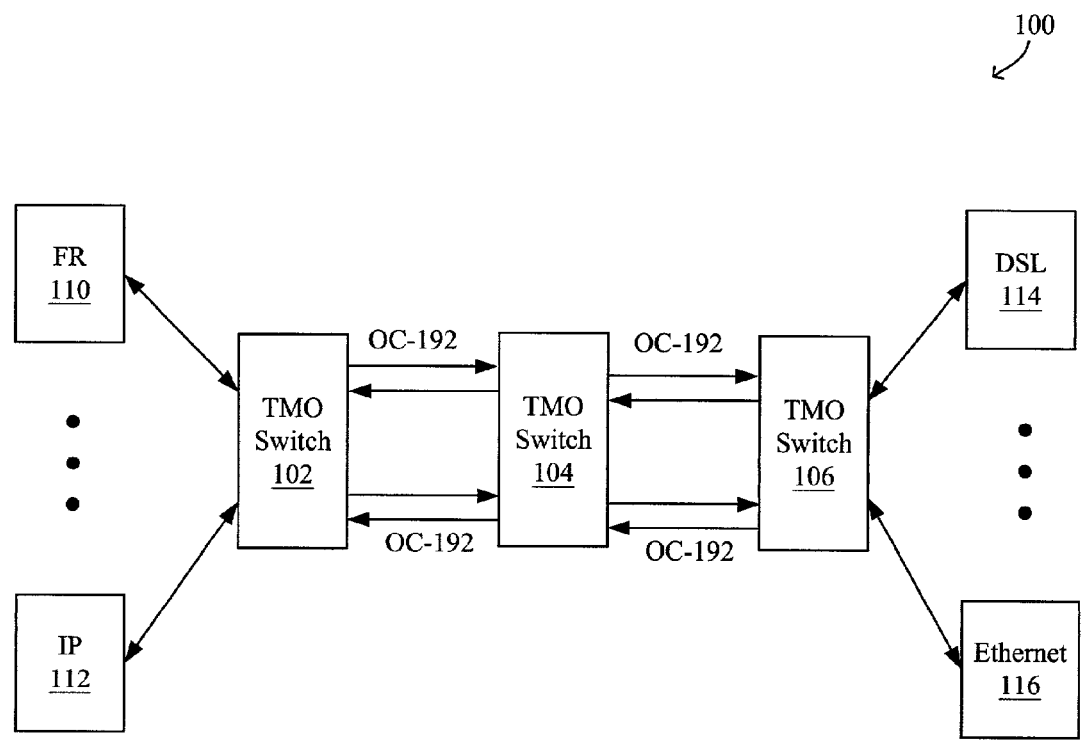
FIG. 1 is a block diagram of a SONET network having Trans-Metro Optical (TMO) switches.
Figure 2:
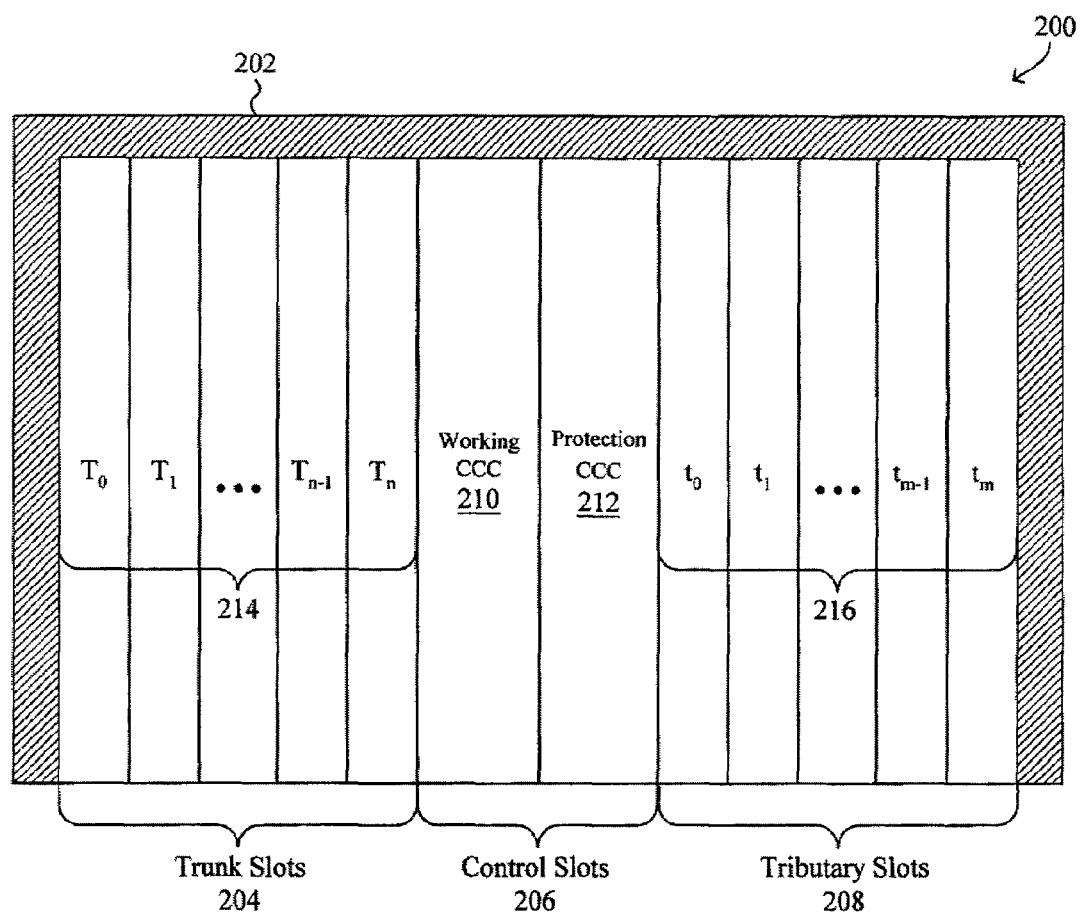
FIG. 2 is a schematic illustrating an exemplary embodiment of a configuration of a TMO switch.

An overview of an exemplary SONET network architecture will be presented with reference to FIGS. 1 and 2. FIG. 1 is a block diagram of a SONET network 100 having TMO switches 102, 104, 106. TMO switches provide multiple functions and allow non-voice data to be carried in a more efficient manner than typical SONET switches. According to one preferred embodiment, each TMO switch provides signal aggregation/concentration and time and space switching. Each TMO switch may provide several card slots to receive cards. The cards inserted into the slots of a particular TMO switch determines the functionality of that TMO switch. Preferably, each card slot of the TMO switch can support any provided functionality of the inserted card.

In the example shown in FIG. 1, TMO switches 102, 106 provide communication interfaces between a SONET ring and customer premises and/or other equipment. In particular, TMO switch 102 is in communication with FR device 110 and IP device 112. In addition, TMO switch 106 is in communication with DSL device 114 and Ethernet device 116. Although not shown, each TMO switch 102, 106 may alternatively or additionally be in communication with various other suitable devices such as local area networks (LANs), ATM devices, PBXs, Terabit routers, and/or optical cross-connects.

TMO switches 102, 106 are in communication with TMO switch 104 in a same or similar manner as communication between SONET switches. In the example shown in FIG. 1, the connections between TMO switch 104 and TMO switches 102, 106 are OC-192 although any other suitable connection may be utilized.

In general, each TMO switch provides multiple SONET platforms into a single TMO platform. In one embodiment, each TMO switch provides switching scalability from DS-1 to OC-768, full function add/drop multiplexer (ADM) capabilities, multi-service circuit and packet provisioning, and advanced bandwidth optimization and management. Any other SONET protocols such as bit rates greater than OC-768 can also be supported.

FIG. 2 is a schematic illustrating one exemplary embodiment of a configuration of a TMO switch 200. The TMO switch 200 includes a chassis 202 that provides various slots such as control slots 204, trunk slots 206, and tributary slots 208. The TMO switch 200 may include an interconnection back plane (not shown) that interconnects multiple cards inserted into the slots 204–208. As shown, the exemplary TMO switch 200 has an active or working cross-connect card (CCC) 210 and a protection CCC 212 that provides redundancy for the working CCC 210.

The TMO switch may have trunk cards $T_0$–$T_n$ 214 each inserted into one of the trunk slots 206 as well as tributary cards $t_0$–$t_m$ 216 each inserted into one of the tributary slots 208. In general, the trunk cards provide an interface to one or more other devices using high speed SONET connections such as OC-192 and OC-768 while tributary cards provide interfaces to one or more lower speed devices such as D1, ATM, FR, or DS3. Although specific types of cards are shown and described as inserted into specific types of slots, it is noted that the TMO switch 200 may provide multi-purpose slots into which any type of card may be inserted.

The CCC allows data to be communicate between trunk cards 214 and tributary cards 216. For example, multiple DS3 tributary cards can receive data from multiple sources and the data received via the tributary cards can be combined and communicated to another TMO switch via an OC-48 connection. As another example, multiple Ethernet and IP cards can receive data from multiple LANs and the data can be combined and transmitted using a suitable SONET protocol.

Although not shown, the TMO switches in a SONET network are in communication with a network management system that provide provisioning and support to the TMO switches. The network management system facilitates in provisioning, supporting, and managing each TMO switch and its inserted cards. The network management system preferably provides a graphical user interface (GUI) through which network system administrators or other users may set up, modify, and manage the SONET network.

An overview of an exemplary SONET network architecture having been presented, systems and methods for automatic provisioning of equipment, topology, and end-to-end paths, respectively, for SONET networks will now be described in detail below. It is noted that the network management system optionally includes options for the administrator or other user to selectively activate or deactivate any combination of the automatic provisioning processes described herein.

Automatic System (Equipment and Facility) Provisioning for a SONET Network

Figure 3A:
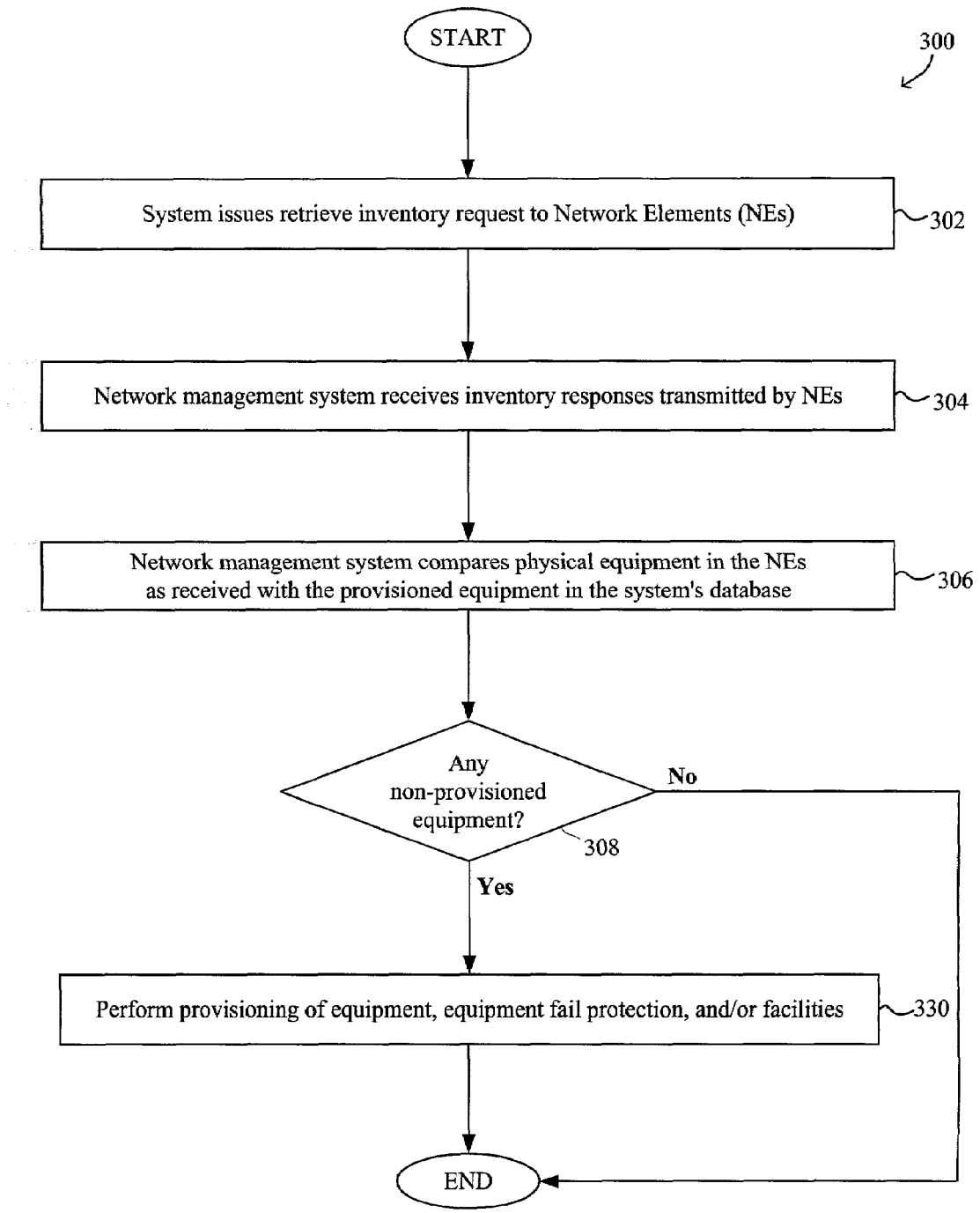
FIGS. 3A and 3B are flow charts illustrating overviews of alternative automatic equipment and facilities provisioning processes performed by a network management system.
Figure 3B:
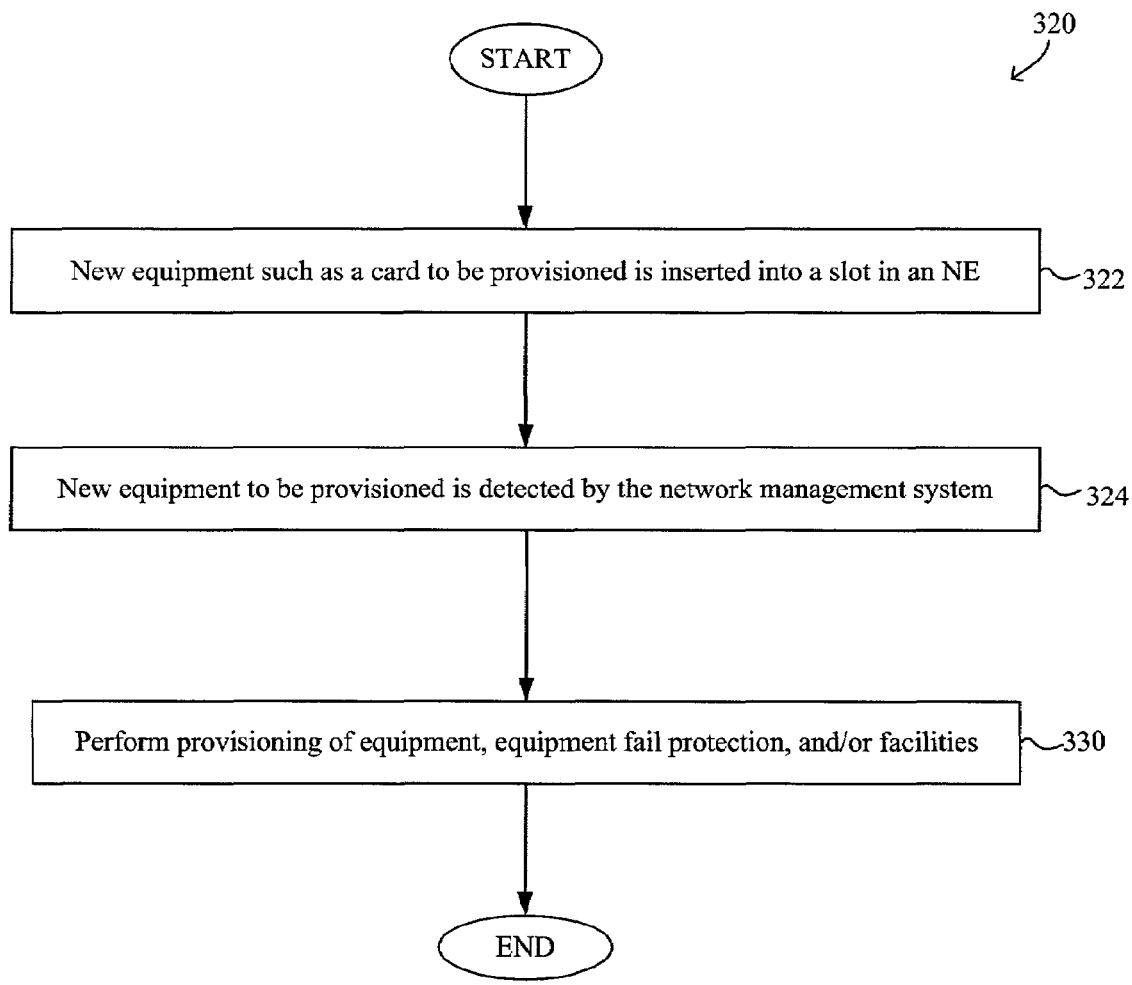

FIGS. 3A and 3B are flow charts illustrating overviews of alternative automatic equipment and facilities provisioning processes 300, 320 performed by a network management system for provisioning and supporting the network. For one embodiment, facilities provisioning comprises parameters that determine the SONET and/or optical provisioning of a group of one or more ports in a card. Each of these processes is described in detail below.

FIG. 3A illustrates an automatic equipment and facilities provisioning process 300 in which the network management system is connected to a network element (NE) to be provisioned, for example, after a log off or when the network management system server is initially started or restarted. In particular, at step 302, the system issues a retrieve inventory request to the NEs with which the system is in communication. At step 304, the network management system receives the responses transmitted by NEs in response to the system's retrieve inventory request. At step 306, the network management system compares the physical equipment in the NEs with the provisioned equipment in the system's database. At step 308, the network management system determines if any equipment from the inventory is not provisioned. If the network management system does not locate any equipment that is not provisioned, the system provisioning process is complete. Alternatively, if the network management system locates any equipment that is not provisioned, the system performs provisioning of equipment, equipment fail protection, and/or facilities at step 330.

Alternatively, as shown in FIG. 3B, the network management system may also perform an automatic equipment and facilities provisioning process 320 during normal operation of the system such as when a new card or other equipment is detected by the network management system. In particular, at step 322, a new card to be provisioned is introduced. The new card to be provisioned may be introduced, for example, when the card is inserted into the TMO switch or if the TMO switch is first brought up with cards already inserted in the slots.

At step 324, the new card to be provisioned is detected by the network management system. The new card is typically detected by the system when the new card or the network element that received the new card transmits a notification to the system. Any other suitable method for detection of a new card to be provisioned may be implemented such as by having the system continually or periodically monitor the statuses of the slots of the switches. The detection by the system preferably includes detection of the card type, e.g., DS3 card, that is to be provisioned. For example, for one embodiment where the card transmits a notification to the system, the notification preferably includes card type information (e.g. ATM card, frame relay card, or optical card), port density, and/or transmission wave length requirements of the new equipment. At step 330, the system performs provisioning of equipment, equipment fail protection, and/or facilities. For another embodiment, the element management system maintains a database of all the equipment include in a network. Thus, any equipment change results in a mismatch within the database and the element management systems uses this mismatch to trigger automatic provisioning for the newly added equipment.

Figure 4:
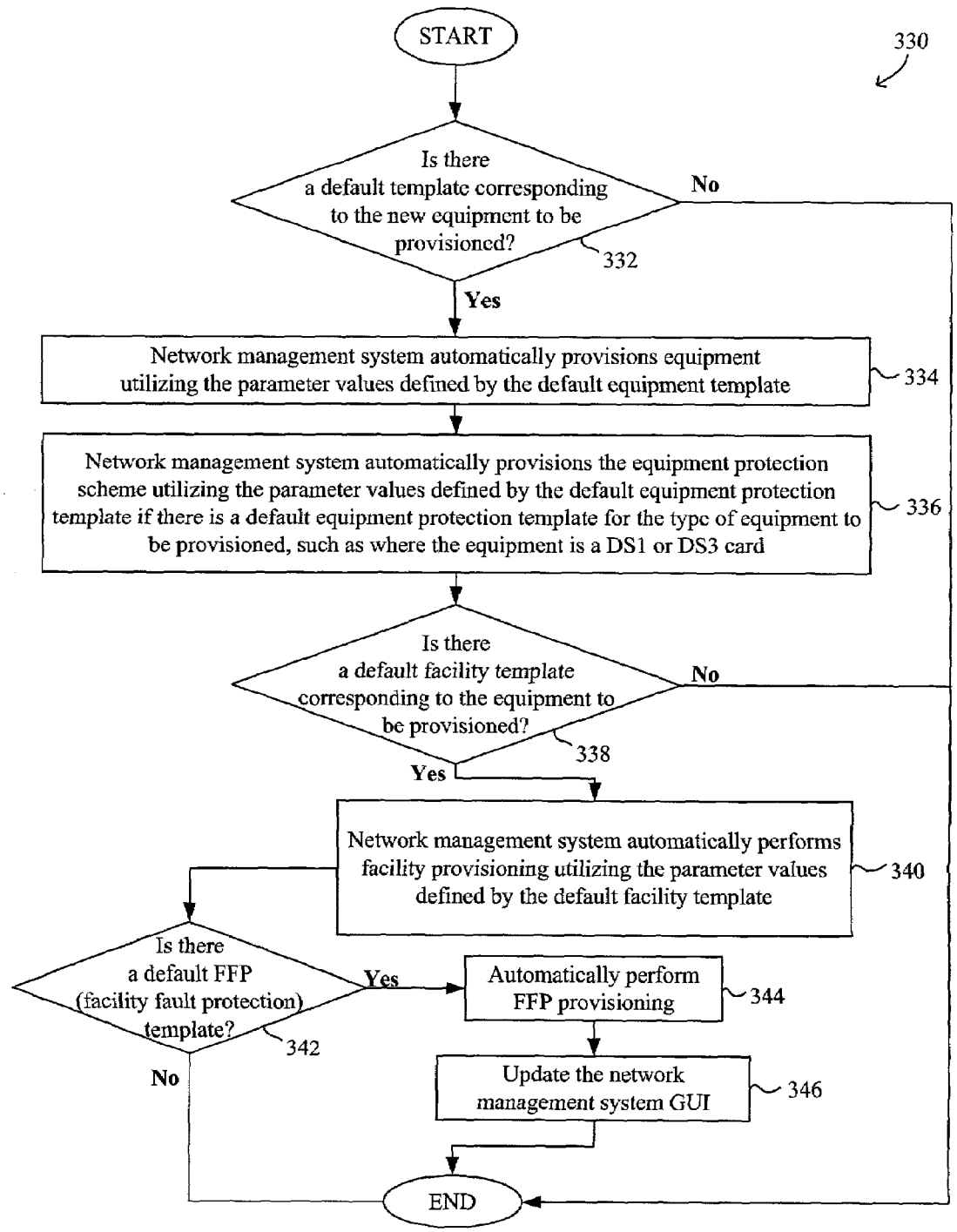
FIG. 4 is a flow chart illustrating the automatic equipment and facilities provisioning process performed by the network management system in more detail.

FIG. 4 is a flow chart illustrating the automatic equipment and facilities provisioning process 330 in more detail. At step 332, the network management system determines if there is a default equipment template corresponding to the new equipment to be provisioned. The system generally makes the determination based upon information on the type of card to be provisioned. Default equipment templates contain a set of predetermined or predefined values associated with various parameters utilized for provisioning of the corresponding type of equipment.

If there is no default equipment template corresponding to the equipment to be provisioned, then the provisioning equipment and facilities provisioning process 330 terminates. Alternatively, if there is a corresponding default template, then the network management system automatically provisions the equipment utilizing the parameter values defined by the default equipment template at step 334.

Next, at step 336, if there is a default equipment protection template for the type of equipment to be provisioned, such as where the equipment is a DS1 or DS3 card, then the network management system automatically provisions the equipment protection scheme utilizing the parameter values defined by the default equipment protection template.

At step 338, the network management system determines if there is a default facility template corresponding to the equipment to be provisioned. If there is no default facility template corresponding to the equipment to be provisioned, then the provisioning equipment and facilities provisioning process 330 terminates. Alternatively, if there is a default facility template for the type of equipment to be provisioned, then the network management system automatically performs facility provisioning utilizing the parameter values defined by the default facility template at step 340. It is noted that each card may have one or more facilities and the network management system preferably provisions each facility in the card to be provisioned.

At step 342, the network management system determines if there is a default FFP (facility fault protection) template corresponding to the equipment to be provisioned. If there is no default FFP template corresponding to the equipment to be provisioned, then the provisioning equipment and facilities provisioning process 330 terminates. Alternatively, if there is a default FFP template for the type of equipment to be provisioned, then the network management system automatically performs FFP provisioning utilizing the parameter values defined by the default FFP template at step 344. It is noted that each card may have one or more facilities and the network management system preferably provisions FFP for each facility in the card to be provisioned.

Next, at step 346, the GUI for the network management system is preferably updated.

The default equipment, equipment protection, and facility templates for various card types utilized for automatic equipment and facilities provisioning may be provided for, set up by, or otherwise predefined by an administrator or other user. Examples of types of cards for which default provisioning templates may be predefined include DS3, DS1, OC3, OC48, OC12, OC192 equipment and facilities. As is evident, various other default equipment and facilities provisioning templates may be provided.

Figure 5A:
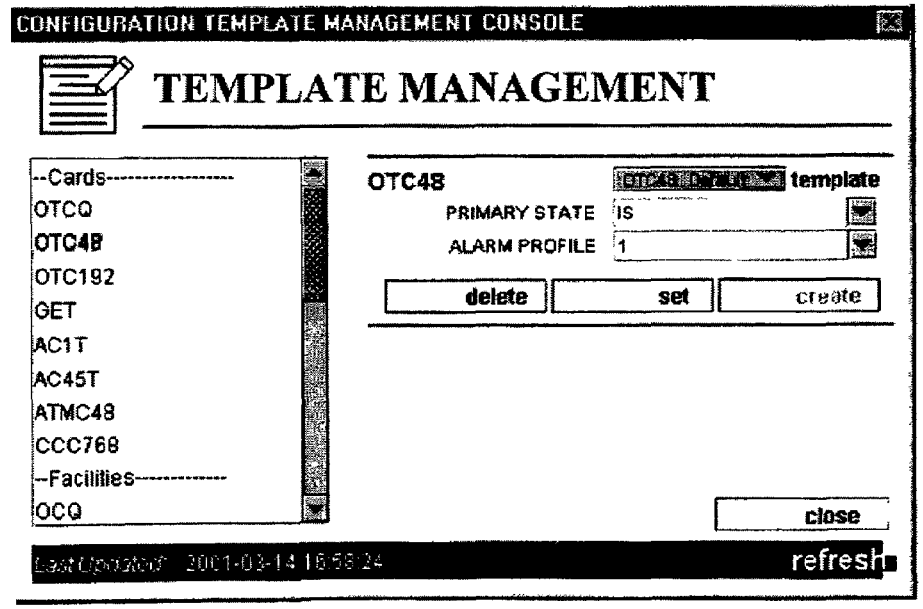
FIGS. 5A–5C are examples of predefined templates utilized for automatic equipment and facilities provisioning.
Figure 5B:
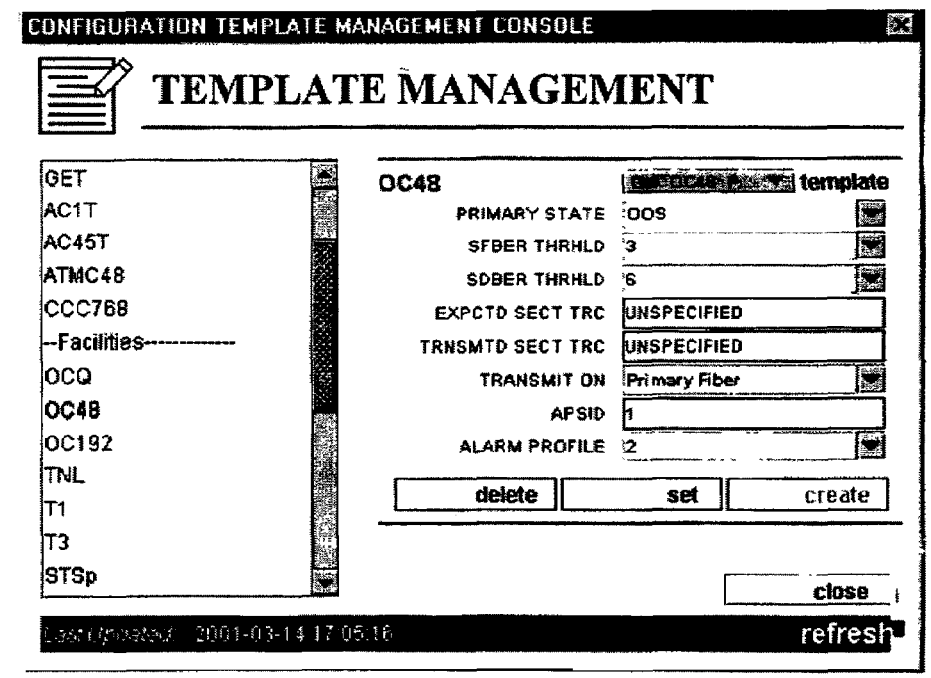
Figure 5C:
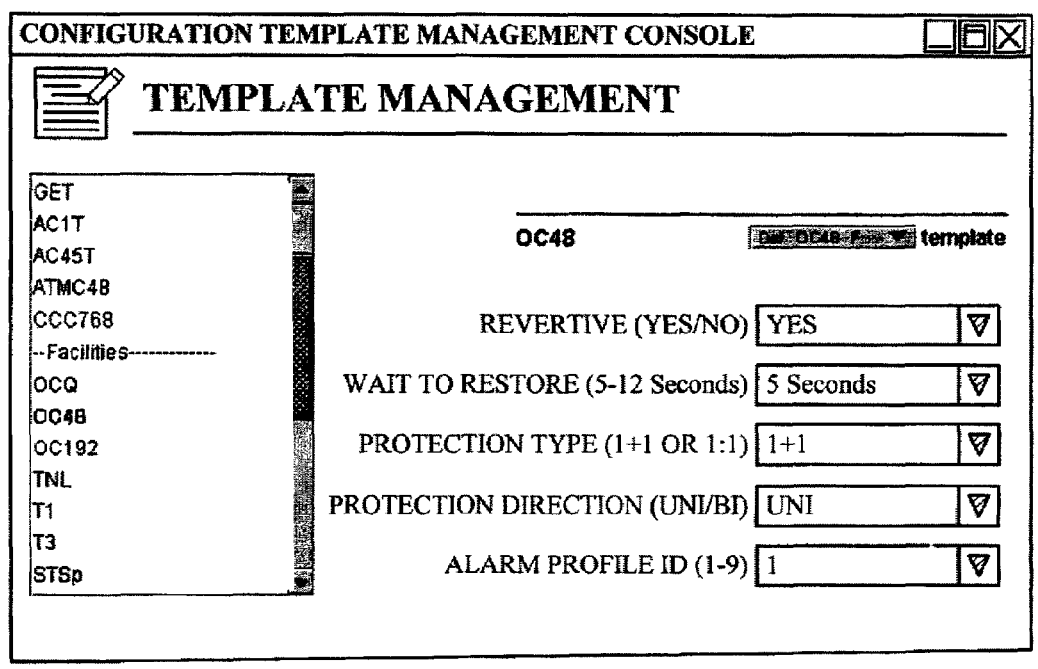

FIGS. 5A–5C are examples of predefined templates utilized for automatic equipment and facilities provisioning. FIG. 5A is an exemplary default OTC48 type equipment template for specifying values of parameters such as primary state and alarm profile or in service or out of service parameters. As another example, FIG. 5B illustrates an exemplary default OC48 type facility template for specifying values of parameters such as primary state, SF (signal failure) and SD (signal degradation) BER (bit error rate) thresholds, transmit on, APSID (automatic protection switching ID), wave length information for DWDM signaling, and alarm profile. In addition, FIG. 5C is an example of a default EFP (equipment fault protection) and FFP template for specifying values of parameters such as revert option (yes or no), wait to restore (e.g., 5 to 12 seconds), protection type (e.g., 1+1 or 1:1), protection direction (e.g., unidirectional or bi-directional), and alarm profile (e.g., 1 to 9).

As noted, the values for various parameters as stored in default provisioning templates are transmitted by the network management system. According to one preferred embodiment, the cross-connect card (CCC) of the TMO switch receives and stores these default template parameter values. The TMO switch may then configure itself using the stored values. Alternatively, the network management system may choose to utilize one template that includes all the default provisionable parameters for each type of equipment.

Automatic Discovery and Provisioning of Topology for a SONET Network

Figure 6:
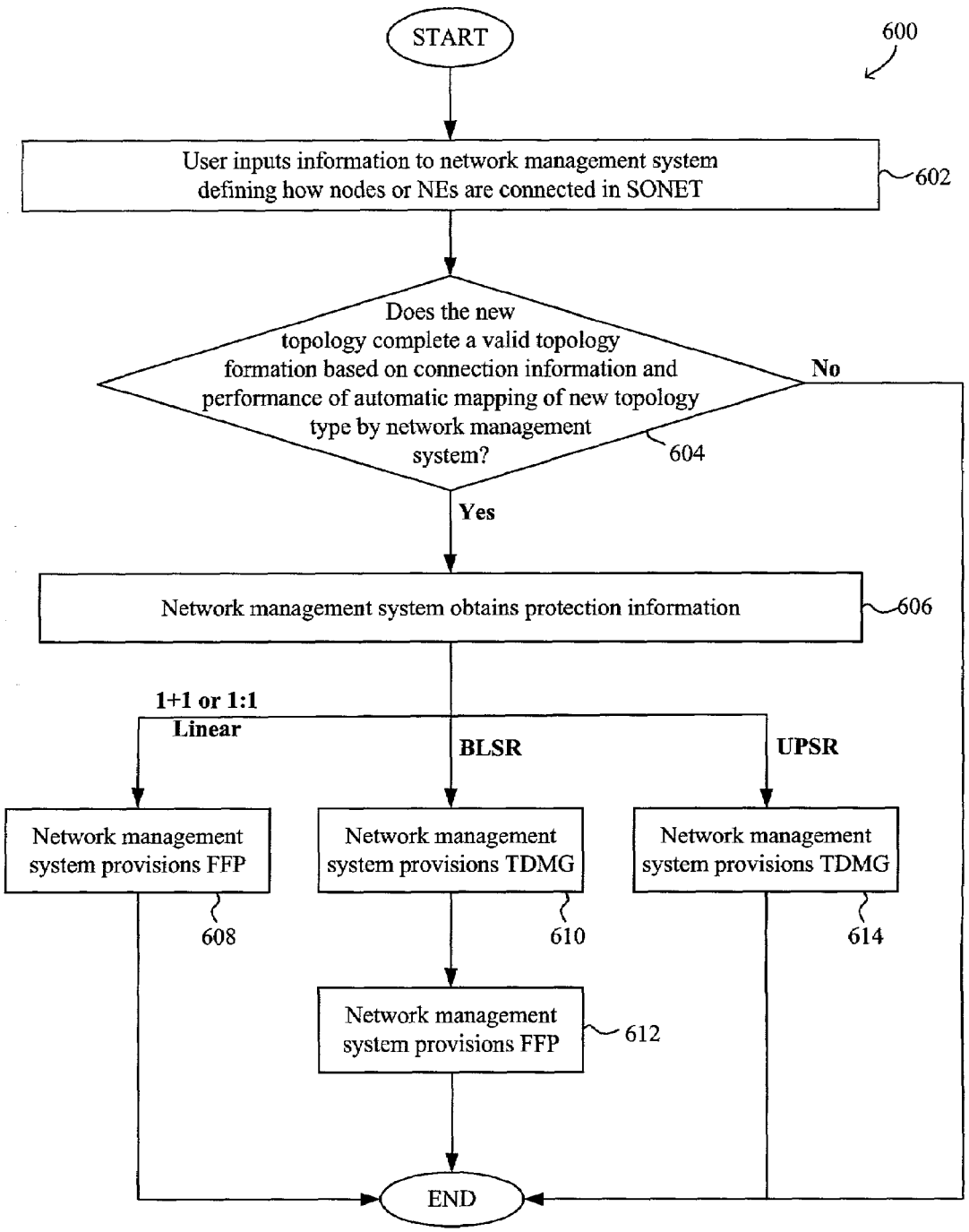
FIG. 6 is a flow chart illustrating an automatic topology provisioning process performed by a network management system.

FIG. 6 is a flow chart illustrating an automatic topology discovery and provisioning process 600. The network management system may perform automatic topology provisioning, for example, when a new topology or sub-network is created and when connections between NEs are modified. In particular, at step 602, the administrator or other user inputs network connection information into the network management system that defines how nodes are connected in the SONET network. The user may input the sequence of how NEs are connected for a new topology or sub-network by, for example, specifying the port/device connections. In other words, the network connection information describes the topology of the network, i.e., the interconnections of the network elements. Alternatively, the user may input modifications to the network connections, add or remove certain NEs, and/or modify the protection mechanisms.

At step 604, based on the connection information obtain in step 602, the network management system performs automatic mapping of new topology type to determine if the new topology completes a valid topology formation. Examples of topology types include ring, linear, mesh, single ring, dual home ring, spur ring, single home ring, match node ring, and any other suitable topologies. In addition, the automatic determination of the connection relationship may include determination of the connection type, fiber rate, slot number, port number, etc. If the new topology does not complete a ring formation, then the automatic topology discovery and provisioning process 600 terminates.

Alternatively, if the system determines that the new topology does complete a ring formation, then at step 606, the system obtains protection information for the new topology such as from the administrator via the GUI. Examples of automatic protection switch (APS) schemes include bidirectional line switched ring (BLSR) protection mechanism, unidirectional path switched ring (UPSR) protection mechanism, and 1:1 or 1+1 linear protection mechanism. The automatic topology provisioning process performed by the network management system preferably includes logic to determine the choices of APS from which the administrator can choose based on the information corresponding to the SONET network being provisioned.

The network management system transmits commands to the NEs in the network to set up the entities responsible for the selected protection scheme(s). In particular, if the protection scheme is 1:1 or 1+1 linear, then the process proceeds to step 608 in which the network management system provisions facility fault protection (FFP). If the protection scheme is BLSR, then the process proceeds to steps 610 and 612 in which the network management system provisions time-division multiplexing group (TDMG) and FFP, respectively. Alternatively, if the protection scheme is UPSR, then the process proceeds to step 614 in which the network management system provisions TDMG. It is noted that a given network may implement more than one type of protection scheme. In such as case, the network management system provisions each protection scheme by performing the steps corresponding to each implemented protection scheme.

For the BLSR protection, the TDMG provisioning step 610 includes determining and provisioning a ring map for each network element or node. In particular, each node has its own ring map as determined by the network management system that can be stored, for example, by the CCC of the TMO switch. To facilitate the determination and definition of the ring maps, the network management system may optionally assign APSID (APS identification) to each node.

Figure 7:
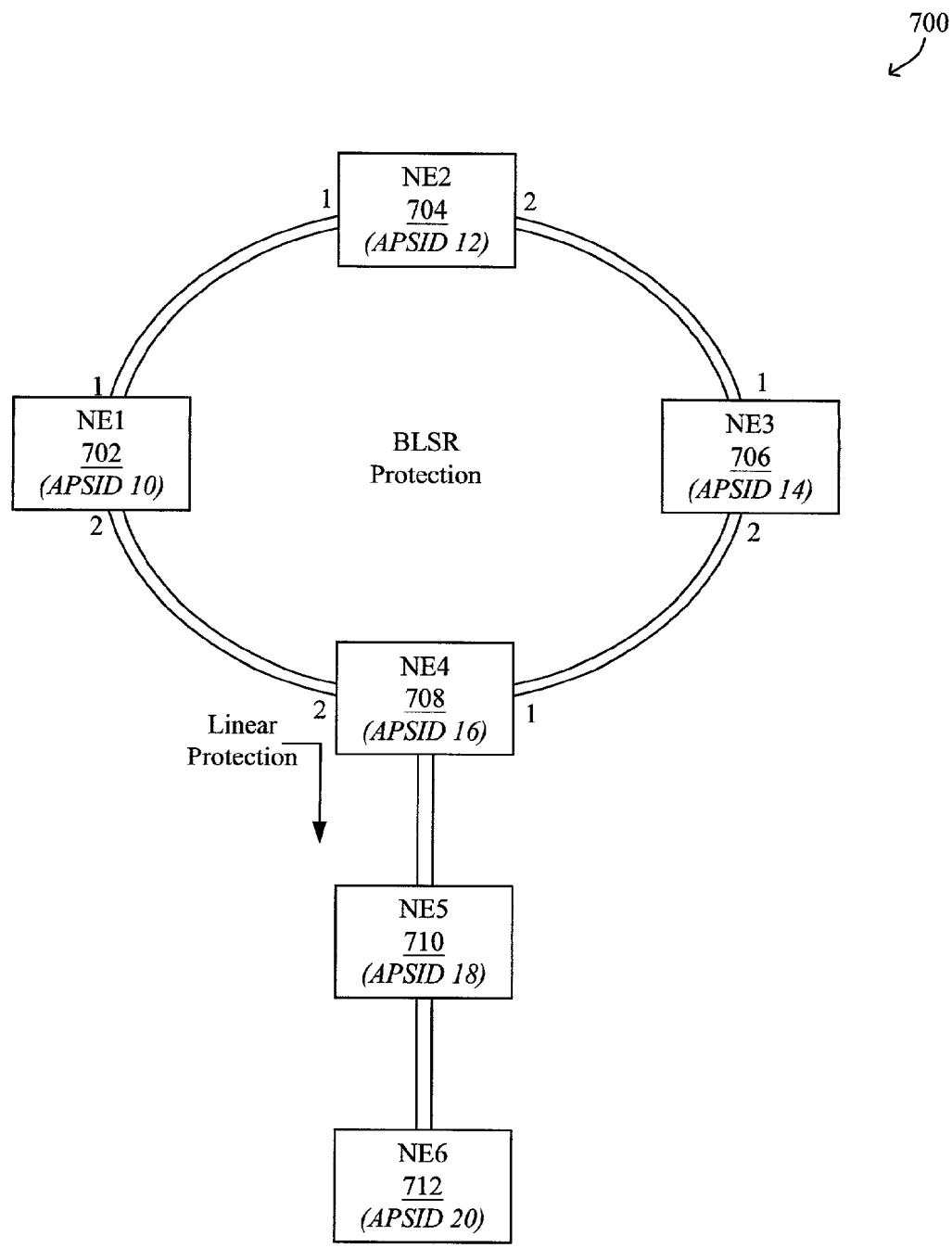
FIG. 7 is a schematic of an exemplary SONET network implementing BLSR protection scheme for illustrating determination and definition of ring maps.

FIG. 7 is a schematic of an exemplary spur ring topology SONET network 700 for illustrating determination and definition of ring maps in the BLSR protection scheme portion of the network. As shown, the exemplary network 700 implements BLSR protection scheme for the ring portion and linear protection scheme for the linear portion of the spur ring network 700.

Each network element in the BLSR portion has two numbered slots, slot #1 and slot #2, and is assigned an APSID. For purposes of determining the ring maps for each of network elements 702–708 in the BLSR portion, it may be predefined that odd number slots are primary and even number slots are secondary. For example, the ring map for NE1 702 is determined using primary slot #1 of NE1 such that the ring map is a sequence of connected NEs determined by traversing the BLSR portion from and in the direction of the primary slot. Thus, the ring map for NE1 702 traverses the BLSR ring in a clockwise direction, i.e., NE2 704 (APSID 12), NE3 706 (APSID 14), and NE4 708 (APSID 16). As another example, the ring map for NE2 704 is determined using primary slot #1 of NE2. Thus, the ring map for NE2 704 traverses the BLSR ring in a counterclockwise direction, i.e., NE1 702 (APSID 10), NE4 708 (APSID 16), and NE3 706 (APSID 14). Generally, only a single ring map is determined for each NE or node.

For the BLSR and UPSR protection, the TDMG provisioning step preferably includes bandwidth provisioning such that different protection schemes may be set up for and be associated with different portions of the bandwidth. In other words, the each bandwidth portion or the entire bandwidth may be set up for and be associated with a single protection scheme.

Automatic Provisioning of End-to-End Paths for a SONET Network

Figure 8:
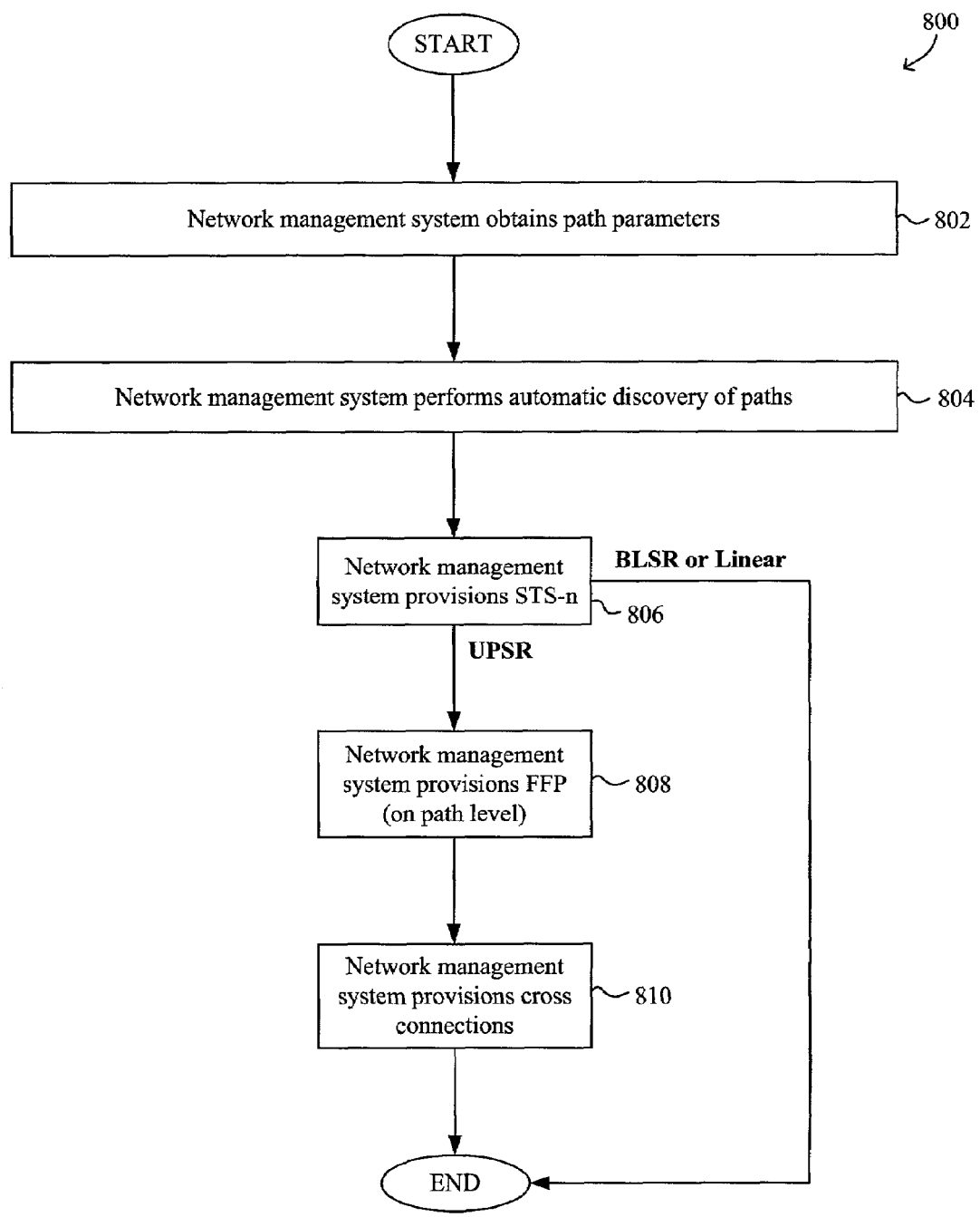
FIG. 8 is a flow chart illustrating an automatic path provisioning process performed by a network management system.

FIG. 8 is a flow chart illustrating an automatic path provisioning process 800. At step 802, the network management system obtains path parameters such as from the administrator via the GUI. Examples of path parameters include bandwidth size, start NE, end NE, path trace, section trace, cross connect direction (one way or two way), pass through, and add-drop facility. In particular, the network management system checks load information and available bandwidth information of scheduled cross connection for each NE. The network management system may also check for connection possibilities. According to one preferred embodiment, the network management system may query each NE to determine if the NE has the appropriate bandwidth and facility for the end-to-end path to be provisioned.

Next, at step 804, the network management system performs automatic discovery of paths based on the links, cross connection, equipment, facilities and availability information for the NEs as obtained in step 802. The network management system optionally builds a list of all connection possibilities for the end-to-end path. In one embodiment, the system then selects the shortest or otherwise least-cost path as the working path and the second shortest or least-cost path as the protection path. It is noted that for the BLSR protection scheme, the system only provisions the working path and, in =the event of error, fault, or other failure, the ring map stored by each NE is utilized to determine the protection path such that each NE determines the next hop in the event of error or fault.

It is to be understood that any metric such as the number of hops may be utilized in determining the shortest and/or second shortest or least cost path. In addition, although the working path is preferably the shortest path and the protection is preferably the second shortest path, any other suitable selection of the working and protection paths may be implemented.

At step 806, the network management system automatically provisions STS-n in all NEs in the end-to-end working path (or the protection path if UPSR). STS-n (Synchronous Transport Signal) defines the basic speeds of the SONET hierarchy. If the APS scheme is BLSR or linear, then the automatic path provisioning process 800 is complete. Alternatively, if the APS scheme is UPSR, then the network management system also automatically provisions FFP on the path level and cross connections at steps 808, 810, respectively.

The automatic path provisioning process 800 enables dynamic allocation of bandwidth based on various factors such as the traffic type and the Quality of Service (QoS) needs such as the QoS needs for TDM, ATM, IP, FR, etc. As an example of dynamic allocation, a given access customer may only need a small amount of capacity during certain hours of the day and a large amount of capacity during other hours. With the automatic path provisioning process 800, the user may specify such information to the network management system and the desired capacity can be easily, quickly, and automatically provisioned, resulting in efficiency with reduced bandwidth waste.

For example, users can create and reserve the bandwidth for a path to be provisioned. This path can then be activated or deactivated on a scheduled basis, or deleted at a scheduled time or after a predetermined period, for example. A path manager application of the network management system can monitor these schedules and automatically activate (provision required entities in the end-to-end path), deactivate (un-provision entities in the end-to-end path), and/or delete the scheduled path.

Figure 9:
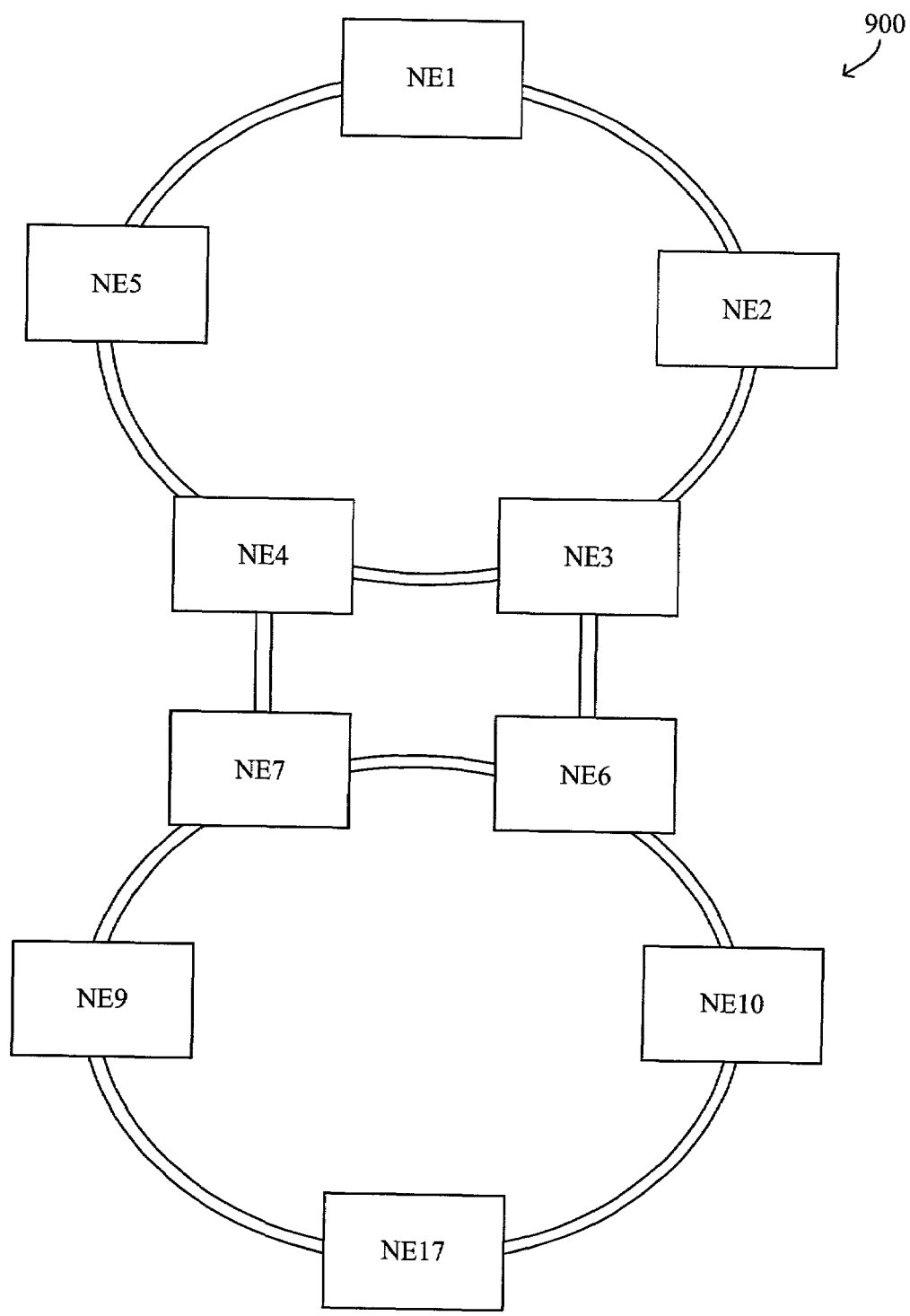
FIG. 9 is a schematic of an exemplary match node ring SONET network for illustrating automatic determination of the working and protection paths by the network management system.

FIG. 9 is a schematic of an exemplary match node ring SONET network 900 using UPSR protection mechanism for illustrating automatic determination of the working and protection paths by the network management system. Using the number of hops as the metric for determining the shortest and second shortest paths, the working path from add node NE1 to drop node NE17 is:

NE1--NE2--NE3--NE6--NE10--NE17

In addition, the protection path from add node NE1 to drop node NE17 in a NE3 node failure scenario is:

NE1--NE5--NE4--NE7--NE9--NE17

Figure 10:
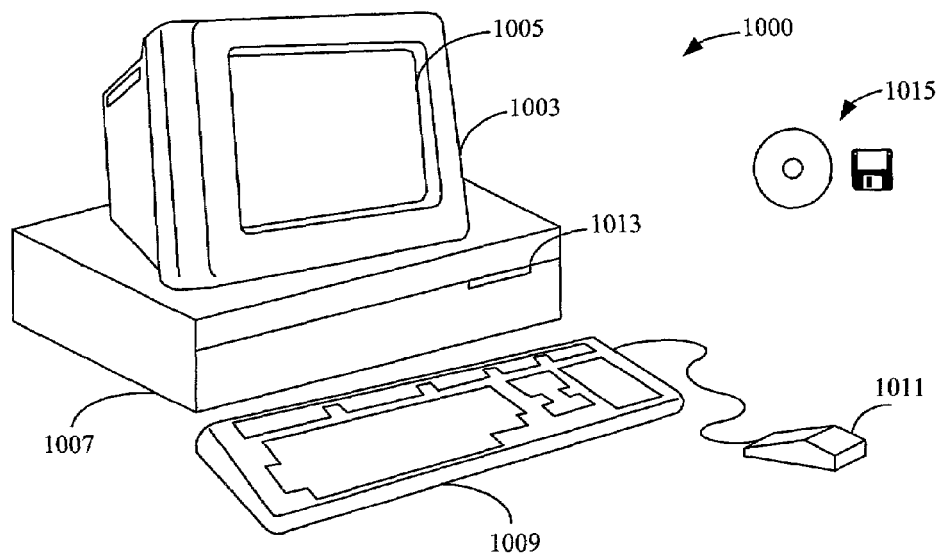
FIG. 10 illustrates an example of a computer system that can be utilized with the various embodiments of method and processing described herein.
Figure 11:
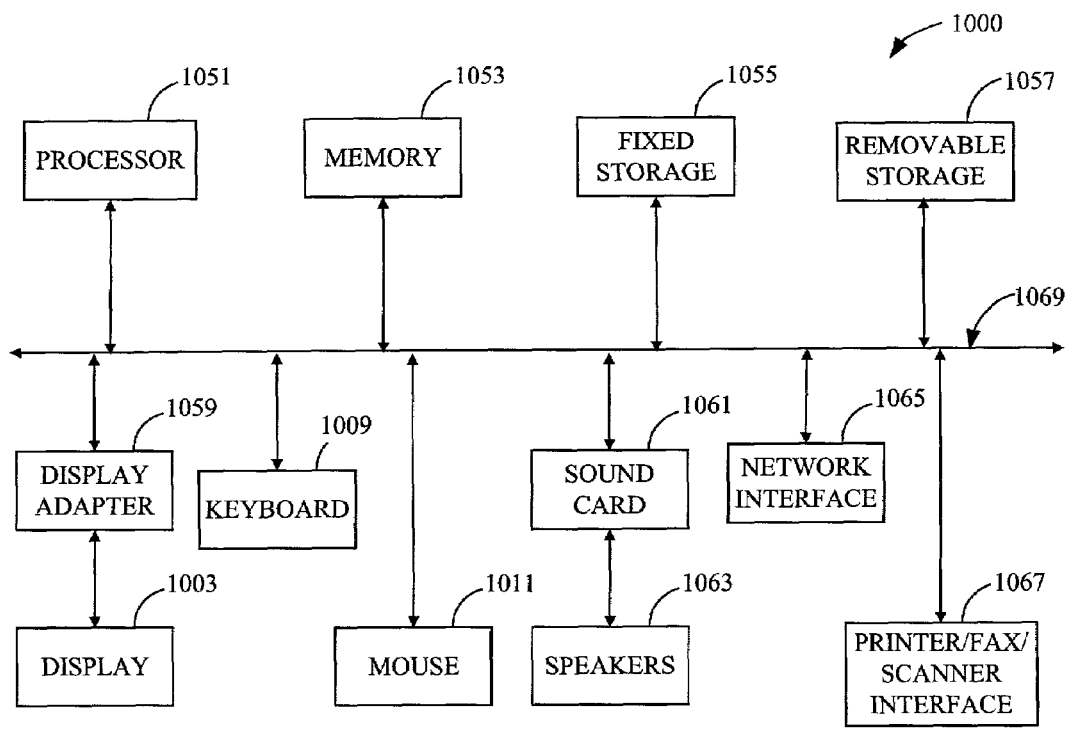
FIG. 11 illustrates a system block diagram of the computer system of FIG. 10.

FIGS. 10 and 11 illustrate a schematic and a block diagram, respectively, of an example of a general purpose computer system 1000 suitable for executing software programs that implement the methods and processes of the network management system as described herein. The architecture and configuration of the computer system 1000 shown and described herein are merely illustrative and other computer system architectures and configurations may also be utilized.

The illustrative computer system 1000 includes a display 1003, a screen 1005, a cabinet 1007, a keyboard 1009, and a mouse 1011. The mouse 1011 can have one or more buttons for interacting with a GUI (graphical user interface) that may be displayed on the screen 1005. The cabinet 1007 typically house one or more drives to read a computer readable storage medium 1015, system memory 1053, and a hard drive 1055, any combination of which can be utilized to store and/or retrieve software programs incorporating computer codes that implement the methods and processes described herein and/or data for use with the software programs, for example. Examples of computer or program code include machine code, as produced, for example, by a compiler, or files containing higher level code that may be executed using an interpreter.

Computer readable media may store program code for performing various computer-implemented operations and may be encompassed as computer storage products. Although a CD-ROM and a floppy disk 1015 are shown as exemplary computer readable storage media readable by a corresponding CD-ROM or floppy disk drive 1013, any other combination of computer readable storage media can be utilized. Computer readable medium typically refers to any data storage device that can store data readable by a computer system. Examples of computer readable storage media include tape, flash memory, system memory, and hard drive may alternatively or additionally be utilized. Computer readable storage media may be categorized as magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Further, computer readable storage medium may also encompass data signals embodied in a carrier wave, such as the data signals embodied in a carrier wave carried in a network. Such a network may be an intranet within a corporate or other environment, the Internet, or any network of a plurality of coupled computers such that the computer readable code may be stored and executed in a distributed fashion.

Computer system 1000 comprises various subsystems. The subsystems of the computer system 1000 may generally include a microprocessor 1051, system memory 1053, fixed storage 1055 (such as a hard drive), removable storage 1057 (such as a CD-ROM drive), display adapter 1059, sound card 1061, transducers 1063 (such as speakers and microphones), network interface 1065, and/or scanner interface 1067.

The microprocessor subsystem 1051 is also referred to as a CPU (central processing unit). The CPU 1051 can be implemented by a single-chip processor or by multiple processors. The CPU 1051 is a general purpose digital processor which controls the operation of the computer system 1000. Using instructions retrieved from memory, the CPU 1051 controls the reception and manipulation of input data as well as the output and display of data on output devices.

The network interface 1065 allows CPU 1051 to be coupled to another computer, computer network, or telecommunications network using a network connection. The CPU 1051 may receive and/or send information via the network interface 1065. Such information may include data objects, program instruction, output information destined to another network. An interface card or similar device and appropriate software implemented by CPU 1051 can be used to connect the computer system 1000 to an external network and transfer data according to standard protocols. In other words, methods and processes described herein may be executed solely upon CPU 1051 and/or may be performed across a network such as the Internet, intranet networks, or LANs (local area networks), in conjunction with a remote CPU that shares a portion of the processing. Additional mass storage devices (not shown) may also be connected to CPU 1051 via the network interface 1065.

The subsystems described herein are merely illustrative of the subsystems of a typical computer system and any other suitable combination of subsystems may be implemented and utilized. For example, another computer system may also include a cache memory and/or additional processors 1051, such as in a multi-processor computer system.

The computer system 1000 also includes a system bus 1069. However, the specific buses shown are merely illustrative of any interconnection scheme serving to link the various subsystems. For example, a local bus can be utilized to connect the central processor to the system memory and display adapter.

For one embodiment, computer system 1000 is coupled to a gateway node element (GNE) which in turn is coupled to NEs that make up a SONET ring or point-to-point connections. Computer system 1000 also includes an element management software (EMS) that provides a graphical user interface (GUI). The GUI allows a user to input and receive provisioning parameters from all NEs coupled to the GNE. For alternative embodiments, the provisioning parameters comprise equipment, path, or topology provisioning.

For example, for one embodiment, computer system 1000 generates TL-1 commands that are propagated from the GNE to all NEs using the DCC channel of a SONET frame. Thus, in the event a user wants to perform equipment inventory provisioning, the user would input a retrieve inventory command identifying a specific NE using the GUI of computer system 1000. Subsequently, the EMS would transform the retrieve inventory command into a TL-1 command that would be transmitted from the GNE to the user identified NE via the DCC channel.

Following the previous example, the user identified NE would respond to the retrieve inventory command using TL-1 responses and the response would be transmitted to the GNE via the DCC channel. The EMS, in turn, would retrieve the response from the GNE and present to response to the user via the GUI. The previous example described a user interaction requesting provisioning information from a specified NE, however it will be appreciated that both the query for provisioning information and the actual provisioning parameters may be performed automatically by computer system 1000. In particular, computer system 1000 may periodically query all NEs coupled to the GNE to determine if there has been any equipment, path, or topology changes and provide provision parameters accordingly. Alternatively, a NE could automatically inform computer system 1000 that the NE is aware of an equipment, path, or topology changes. Subsequently, computer system 1000 would either (a) use the information provided by the NE detecting the change or (b) query the NE to determine the appropriate provisioning parameters.

While the preferred embodiments of the present invention are described and illustrated herein, it will be appreciated that they are merely illustrative and that modifications can be made to these embodiments without departing from the spirit and scope of the invention. For example, although the automatic provisioning systems and methods were described in the context of SONET, it is to be understood that the automatic provisioning systems and methods may be adapted and implemented on any other suitable platforms such as the international variant synchronous digital hierarchy (SDH). Accordingly, the invention is intended to be defined only in terms of the following claims.

What is claimed is:

1. A method for automatic end-to-end path provisioning for an optical network by a network management system, comprising:
    obtaining path parameters including scheduled load and availability information for each network element of the network, said obtaining path parameters step comprising:
    issuing an inventory request to the network elements of the optical network; and
    receiving inventory responses from the network elements;
    the method further comprising:
        comparing inventory responses with an inventory database;
        determining if any of the network elements has not yet been provisioned;
        retrieving a default template corresponding to the network element(s) not yet provisioned; and
        automatically provisioning the network element(s) not yet provisioned utilizing parameter values defined by the retrieved default template;
    automatically performing discovery of paths including determining connection possibilities based upon the path parameters; and
    automatically provisioning an end-to-end STS-n path based on the paths resulting from the discovery.

2. The method for automatic end-to-end path provisioning according to claim 1, wherein the path parameters include at least one additional parameter selected from the group consisting of bandwidth size, start network element, end network element, add facility, drop facility, link information, cross connection information, equipment information, and facilities information.

3. The method for automatic end-to-end path provisioning according to claim 1, wherein the automatic discovery includes building a list of all possible connections for the end-to-end path.

4. The method for automatic end-to-end path provisioning according to claim 1, wherein the automatic provisioning includes selecting a least cost path from the discovered paths and setting the least cost path as the working path.

5. The method for automatic end-to-end path provisioning according to claim 4, wherein the least cost path is the shortest path based on the number of network element hops.

6. The method for automatic end-to-end path provisioning according to claim 1, wherein the automatic provisioning includes selecting a second least cost path from the discovered paths and setting the second least cost path as the protection path.

7. The method for automatic end-to-end path provisioning according to claim 1, wherein, the network has UPSR protection scheme, automatically provisioning facility fault protection (FFP) and cross connections.

8. A system for automatic end-to-end path provisioning for an optical network by a network management system, comprising:
an input device for obtaining path parameters including scheduled load and availability information for each network element of the network; and
a processor for automatically performing discovery of paths including determining connection possibilities based upon the path parameters and for automatically provisioning an end-to-end STS-n path based on the paths resulting from the discovery;
said processor obtaining path parameters by issuing an inventory request to the network elements of the optical network and receiving inventory responses from the network elements;
said processor comparing inventory responses with an inventory database and determining if any of the network elements has not yet been provisioned;
said processor retrieving a default template corresponding to the network element(s) not vet provisioned; and
said processor automatically provisioning the network element(s) not yet provisioned utilizing parameter values defined by the retrieved default template.

9. The system for automatic end-to-end path provisioning according to claim 8, wherein the path parameters include at least one additional parameter selected from the group consisting of bandwidth size, start network element, end network element, add facility, drop facility, link information, cross connection information, equipment information, and facilities information.

10. The system for automatic end-to-end path provisioning according to claim 8, wherein the processor automatic discovery includes building a list of all possible connections for the end-to-end path.

11. The system for automatic end-to-end path provisioning according to claim 8, wherein the processor performs automatic discovery by selecting a least cost path from the discovered paths and setting the least cost path as the working path.

12. The system for automatic end-to-end path provisioning according to claim 11, wherein the least cost path is the shortest path based on the number of network element hops.

13. The system for automatic end-to-end path provisioning according to claim 8, wherein the processor performs automatic provisioning by selecting a second least cost path from the discovered paths and setting the second least cost path as the protection path.

14. The system for automatic end-to-end path provisioning according to claim 8, wherein, the network has UPSR protection scheme, the processor being configured to automatically perform facility fault protection (FFP) provisioning and cross connection provisioning.

15. The method for automatic end-to-end provisioning according to claim 1, wherein said automatic provisioning performs dynamic allocation of bandwidth based on one or more factors selected from the group consisting of traffic type, desired quality of service, and the scheduled load and availability information.

16. The method for automatic end-to-end path provisioning according to claim 1, wherein the default template includes a facility fault protection template.

17. The system for automatic end-to-end path provisioning according to claim 8, said processor performing dynamic allocation of bandwidth based on one or more factors selected from the group consisting of traffic type, desired quality of service, and the scheduled load and availability information.

18. The system for automatic end-to-end path provisioning according to claim 8, wherein the default template includes a facility fault protection template.

* * * * *